US012744663B2

(12) United States Patent
Yavuz

(10) Patent No.: US 12,744,663 B2
(45) Date of Patent: Sep. 22, 2026

(54) LIGHTWEIGHT, RESILIENT, AND AGGREGATE SYMMETRIC CRYPTOGRAPHIC TOOLS FOR INTERNET OF THINGS AND FORENSICS

(71) Applicant: UNIVERSITY OF SOUTH FLORIDA, Tampa, FL (US)

(72) Inventor: Attila Altay Yavuz, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 33 days.

(21) Appl. No.: 19/116,000

(22) PCT Filed: Sep. 26, 2023

(86) PCT No.: PCT/US2023/075133
§ 371 (c)(1),
(2) Date: Mar. 27, 2025

(87) PCT Pub. No.: WO2024/073422
PCT Pub. Date: Apr. 4, 2024

(65) Prior Publication Data

US 2026/0106736 A1 Apr. 16, 2026

Related U.S. Application Data

(60) Provisional application No. 63/377,446, filed on Sep. 28, 2022.

(51) Int. Cl.
*H04L 9/08* (2006.01)
*H04L 9/32* (2006.01)

(52) U.S. Cl.
CPC ............ *H04L 9/085* (2013.01); *H04L 9/3242* (2013.01)

(58) Field of Classification Search
CPC .............................. H04L 9/085; H04L 9/3242
See application file for complete search history.

(56) References Cited

U.S. PATENT DOCUMENTS 10,587,416 B1 3/2020 Yavuz
10,630,478 B1 4/2020 Yavuz
(Continued)

FOREIGN PATENT DOCUMENTS

EP 0836775 B1 8/2006
EP 3654579 A1 5/2020
WO 2022/046130 A1 3/2022

OTHER PUBLICATIONS

Rivest R.L., et al., "A Method for Obtaining Digital Signatures and Public-Key Cryptosystems," Communications of the ACM, Feb. 1, 1978, vol. 21, No. 2, pp. 120-126.
(Continued)

*Primary Examiner* — Viral S Lakhia
(74) *Attorney, Agent, or Firm* — Meunier Carlin & Curfman LLC

(57) ABSTRACT

A method of data encryption for messages transmitted between two or more computing devices includes determining a current secret key that is shared between a first computing device and a second computing device, calculating a current message authentication code (MAC) based on the current secret key and the message, calculating a subsequent secret key based on the current secret key using a one-way pseudorandom function, calculating a subsequent MAC by aggregating the current MAC and a first preceding aggregate MAC, and encrypting the message using the subsequent MAC and the subsequent secret key.

17 Claims, 4 Drawing Sheets

(56) References Cited

U.S. PATENT DOCUMENTS

| | | | | |
|---|---|---|---|---|
| 11,271,728 B2 * | 3/2022 | Mandal | H04L 9/30 | |
| 11,323,267 B1 * | 5/2022 | Griffin | H04L 9/085 | |
| 11,418,329 B1 * | 8/2022 | Miller | H04L 9/085 | |
| 11,698,869 B1 * | 7/2023 | Kulkarni | G06F 12/1458 | 711/163 |
| 11,736,459 B2 * | 8/2023 | Wang | G06F 21/40 | |
| 11,750,580 B2 * | 9/2023 | O'Connell | H04L 9/3242 | 713/151 |
| 11,799,662 B2 * | 10/2023 | Shahar | H04L 9/0825 | |
| 11,818,268 B2 * | 11/2023 | Vermeulen | H04L 9/3213 | |
| 12,047,519 B2 * | 7/2024 | Zheng | H04L 9/0841 | |
| 12,489,620 B2 * | 12/2025 | Rindal | H04L 9/0618 | |
| 2019/0074975 A1 * | 3/2019 | Koskimies | H04W 12/126 | |
| 2021/0391983 A1 * | 12/2021 | Will | H04L 9/0643 | |
| 2022/0417002 A1 * | 12/2022 | Esiner | H04L 9/0866 | |

OTHER PUBLICATIONS

Rushanan M., et al., "SOK: Security and Privacy in Implantable Medical Devices and Body Area Networks," Proceedings of the 2014 IEEE Symposium on Security and Privacy (SP '14), IEEE Computer Society, 2014, pp. 524-539.

Sadeghi A-R., et al., "Security and Privacy Challenges in Industrial Internet of Things," Proceedings of the 52nd Annual Design Automation Conference (DAC '15), Jun. 7-11, 2015, pp. 54:1-54:6 (6 Pages).

Schneier B., et al., "Secure Audit Logs to Support Computer Forensics," ACM Transactions on Information and System Security (TISSEC), May 1, 1999, vol. 2, No. 2, pp. 159-176.

Serrano N., et al., "A Complete Study of P.K.I. (PKI's Known Incidents)," The 47th Research Conference on Communications, Information, and Internet Policy (TPRC), 2019, 45 Pages.

Seyitoglu E.U.A., et al., "Compact and Resilient Cryptographic Tools for Digital Forensics," IEEE Conference on Communications and Network Security (CNS), Jun. 29, 2020, pp. 1-9.

Shamir A., "How to Share a Secret," Communications of the ACM, Nov. 1979, vol. 22, No. 11, pp. 612-613.

Shoup V., "A Proposal for an ISO Standard for Public Key Encryption," (Version 2.1), IACR Cryptology ePrint Archive, 2001, p. 112 (63 pages).

Singla A., et al., "Look Before You Leap: Secure Connection Bootstrapping for 5G Networks to Defend Against Fake Basestations," ASIA Conference on Computer and Communications Security(CCS '21), Virtual Event, Hong Kong, New York, USA, Jun. 7-11, 2021, pp. 501-515, Association for Computing Machinery.

Stinson, D., "Cryptography: Theory and Practice," CRC/C&H, 2002, Second Edition, 573 pages.

Stinson D.R., "Universal Hashing and Authentication Codes," Designs, Codes and Cryptography, Oct. 1994, vol. 4, No. 4, pp. 369-380.

Sun S.F., et al., "Efficient Completely Nonmalleable and RKA Secure Public Key Encryptions," Australasian Conference on Information Security and Privacy, 2016, pp. 134-150 (17 pages).

Turan M.S., et al., "Status Report on the Second Round of the NIST Lightweight Cryptography Standardization Process," National Institute of Standards and Technology Internal Report, Jul. 20, 2021, vol. 8369, No. 10.6028, pp. 1-81 (92 Pages).

Wang G., et al., "Improved Fault-Tolerant Aggregate Signatures," The Computer Journal, Apr. 2019, vol. 62, No. 4, 9 pages.

Wang Q., et al., "Time Valid One-Time Signature for Time-Critical Multicast Data Authentication," INFOCOM 2009, IEEE, Apr. 2009, 9 pages.

Yavuz A.A., et al., "BAF: An Efficient Publicly Verifiable Secure Audit Logging Scheme for Distributed Systems," 2009 Annual Computer Security Applications Conference, Dec. 7, 2009, pp. 219-228 (10 Pages).

Yavuz A.A., et al., "BAF and FI-BAF: Efficient and Publicly Verifiable Cryptographic Schemes for Secure Logging in Resource-Constrained Systems," ACM Transactions on Information and System Security (TISSEC), Jul. 1, 2012, vol. 15, No. 2, Article: 9, pp. 1-28.

Yavuz A.A., et al., "Efficient, Compromise Resilient and Append-only Cryptographic Schemes for Secure Audit Logging," 16th International Conference on Financial Cryptography and Data Security, Feb. 27-Mar. 2, 2012, pp. 148-163 (16 Pages).

Yavuz A.A., et al., "Self-Sustaining, Efficient and Forward-Secure Cryptographic Constructions for Unattended Wireless Sensor Networks," Ad Hoc Networks, 2012, vol. 10, No. 7, pp. 1204-1220.

Yavuz A.A., et al., "Hash-Based Sequential Aggregate and Forward Secure Signature for Unattended Wireless Sensor Networks," Proceedings of the 6th Annual International Conference on Mobile and Ubiquitous Systems (MobiQuitous '09), Jul. 2009, 10 pages.

Yavuz A.A., "ETA: Efficient and Tiny Authentication for Heterogeneous Wireless Systems," Proceedings of the Sixth ACM Conference on Security and Privacy in Wireless and Mobile Networks (WiSec '13), Apr. 2013, pp. 67-72.

Yavuz A.A., "Immutable Authentication and Integrity Schemes for Outsourced Databases," IEEE Transactions on Dependable and Secure Computing, 2018, vol. 15, No. 1, pp. 69-82 (14 pages).

Zhao S., et al., "Smart and Practical Privacy-Preserving Data Aggregation for Fog-Based Smart Grids," IEEE Transactions on Information Forensics and Security, 2020, vol. 16, pp. 521-536 (16 pages).

Agrawal S., et al., "DiSE: Distributed Symmetric-Key Encryption," Proceedings of the 2018 ACM SIGSAC Conference on Computer and Communications Security, 2018, pp. 1993-2010.

Agrawal S., et al., "Homomorphic MACs: MAC-Based Integrity for Network Coding," Applied Cryptography and Network Security, 2009, pp. 292-305 (12 pages).

Aumasson J-P., et al., "Blake2: Simpler, Smaller, Fast as MD5," Applied Cryptography and Network Security, Springer Berlin Heidelberg, Editors: Jacobson M., Locasto M., Mohassel P and Safavi-Naini R., 2013, pp. 119-135 (16 Pages).

Behnia R., et al., "Towards Practical Post-Quantum Signatures for Resource-Limited Internet of Things," Association for Computing Machinery, New York, USA, Conference'21, Jun. 2021, pp. 119-130.

Bellare M., et al., "Introduction to Modern Cryptography," May 11, 2005, 283 Pages, UCSD CSE Course, 1st Edition, p. 207 [Online], Retrieved From URL: http://www.cs.ucsd.edu/~mihir/cse207/classnotes.html.

Bernstein D.J., "The Poly1305-AES Message-Authentication Code," Fast Software Encryption: 12th International Workshop, FSE 2005, Revised Selected Papers, Feb. 2005, pp. 32-49 (17 pages).

Best J., "Could Implanted Medical Devices Be Hacked," (BMJ) British Medical Journal, Jan. 14, 2020, vol. 368, m102, 3 Pages.

Black J., et al., "UMAC: Fast and Secure Message Authentication," Proceedings of the 19th Annual International Cryptology Conference on Advances in Cryptology (CRYPTO '99), 1999, pp. 216-233 (29 pages).

Boneh D., et al., "Compact Multi-Signatures for Smaller Blockchains," Advances in Cryptology—ASIACRYPT 2018, 2018, pp. 435-464 (33 pages).

Borghoff J., et al., "Prince: A Low-Latency Block Cipher for Pervasive Computing Applications," In Proceedings of the 18th International Conference on The Theory and Application of Cryptology and Information Security, ASIACRYPT12, 2012, pp. 208-225 (25 Pages) Berlin, Heidelberg, Springer-Verlag.

Coron J.S., "On the Exact Security of Full Domain Hash," Advances in Cryptology (CRYPTO '00), 2000, pp. 229-235 (8 pages).

Cozzo D., et al., "Sharing the LUOV: Threshold Post-Quantum Signatures," Cryptology ePrint Archive, IMA International Conference on Cryptography and Coding, 2019, 24 pages, Retrieved from URL: https://ia.cr/2019/1060.

Cronin E., et al., "On the Performance, Feasibility, and Use of Forward-Secure Signatures," Proceedings of the 10th ACM Conference on Computer and Communications Security, Oct. 27, 2003, pp. 131-144 (15 Pages).

Crosby S.A., et al., "Efficient Data Structures for Tamper Evident Logging," Proceedings of the 18th Conference on USENIX Security Symposium, Aug. 2009, 17 Pages.

(56) References Cited

OTHER PUBLICATIONS

Daemen J., et al., "The Design of Rijndael: AES—The Advanced Encryption Standard," Springer Science & Business Media, 2002, 243 pages.
Damgard I., et al., "Multiparty Computation From Somewhat Homomorphic Encryption," Annual Cryptology Conference, 2012, pp. 643-662 (46 pages).
Delgado-Mohatar O., et al., "An Energy-Efficient Symmetric Cryptography Based Authentication Scheme for Wireless Sensor Networks," in Proceedings of the 4th IFIP WG 11.2 International Conference on Information Security Theory and Practices: Security and Privacy of Pervasive Systems and Smart Devices(WISTP), Apr. 2010, pp. 332-339 (9 Pages), WISTP10, Springer-Verlag.
Elgamal T., "A public key cryptosystem and a signature scheme based on discrete logarithms." IEEE transactions on information theory 31.4 (1985): 469-472.
Etzel M., et al., "Square Hash: Fast Message Authentication via Optimized Universal Hash Functions," Proceedings of CRYPTO '99, Lecture Notes in Computer Science, 1999, pp. 234-251 (18 pages).
Evans D., et al., "A Pragmatic Introduction to Secure Multi-Party Computation," Foundations and Trends in Privacy and Security, 2018, vol. 2, No. 2-3, pp. 70-246, 181 Pages, Retrieved from URL: https://doi.org/10.1561/3300000019.
Gaba G.S., et al., "Secure Device-to-Device Communications for 5G Enabled Internet of Things Applications," Computer Communications, 2021, vol. 169, pp. 114-128 (19 Pages).
Gentry C., et al., "Hierarchical ID-Based Cryptography," Proceedings of the 8th International Conference on the Theory and Application of Cryptology and Information Security: Advances in Cryptology, 2002, vol. 2501, pp. 548-566 (21 pages).
Ghosh S., et al., "Variants of Wegman-Carter Message Authentication Code Supporting Variable Tag Lengths," Designs, Codes and Cryptography, 2021, vol. 89, No. 4, pp. 709-736 (29 pages).
Goldreich O., et al., "How to Construct Random Functions," Journal of the Association for Computing Machinery, Oct. 1986, vol. 33, No. 4, pp. 792-807.
Grissa, M., et al., "LPOS: Location Privacy for Optimal Sensing in Cognitive Radio Networks," 2015 IEEE Global Communications Conference (GLOBECOM), 2015, 7 pages.
Halevi S., et al., "MMH: Software Message Authentication in the Gbit/Second Rates," Proceedings of the 4th International Workshop on Fast Software Encryption (FSE '97), 1997, pp. 172-189 (18 pages).
Hankerson D., et al., "Guide to Elliptic Curve Cryptography," Springer, 2004, 138 Pages.
He Y., et al., "Attacking and Defence Pathways for Intelligent Medical Diagnosis System (IMDS)," International Journal of Medical Informatics, 2021, vol. 148, 104415, 13 Pages.
Holt J.E., "Logcrypt: Forward Security and Public Verification for Secure Audit Logs," Proceedings of the 2006 Australasian Workshops on Grid Computing and E-Research, Jan. 1, 2006, vol. 54, pp. 203-211 (9 Pages).
Idalino T.B., et al., "Nested Cover-Free Families for Unbounded Fault-Tolerant Aggregate Signatures," Theoretical Computer Science, 2021, vol. 854, pp. 116-130.
Itkis G., et al., "Forward-Secure Signatures with Optimal Signing and Verifying," Proceedings of the 21st Annual International Cryptology Conference on Advances in Cryptology (CRYPTO '01), Editor: Killian J, Lecture Notes in Computer Science, Springer-Verlag, Berlin, Heidelberg, 2001, vol. 2139, pp. 332-354.
Johnson D., et al., "The Elliptic Curve Digital Signature Algorithm (ECDSA)," Certicom, International Journal of Information Security, 2001, vol. 1, No. 1, pp. 36-63 (55 Pages).
Kampanakis P., et al., "BAFi: A Practical Cryptographic Secure Audit Logging Scheme for Digital Forensics," Security and Communication Networks, 2015, vol. 8, pp. 3180-3190, Epublished On: Mar. 26, 2015.
Kaps J.P., et al., "Energy Scalable Universal Hashing," IEE Transactions on Computers, 2005, vol. 54, pp. 1484-1495 (11 pages).
Katz J., et al., "Aggregate Message Authentication Codes," Cryptographers Track at the RSA Conference, Apr. 8, 2008, pp. 155-169 (13 Pages).
Keoh S.L., et al., "Securing the Internet of Things: A Standardization Perspective," IEEE Internet of Things Journal, Jun. 2014, vol. 1, No. 3, pp. 265-275 (13 Pages).
Krawczyk H., et al., "HMAC: Keyed-Hashing for Message Authentication," IETF RFC 2104, Feb. 1997, 11 pages.
Krovetz T., "Message Authentication on 64-Bit Architectures," Selected Areas in Cryptography: 13th International Workshop, SAC 2006, 2007, pp. 327-341 (11 pages).
Kumar R., et al., "On Improving Wireless Broadcast Reliability of Sensor Networks Using Erasure Codes," Mobile Ad-hoc and Sensor Networks, Lecture Notes in Computer Science, 2006, vol. 4325, pp. 155-170 (17 pages).
Liang Y., et al., "Energy-Efficient Collaborative Sensing: Learning the Latent Correlations of Heterogeneous Sensors," ACM Transactions on Sensor Networks, Jun. 2021, vol. 17, No. 3, Article. 33, 28 Pages.
Ma D., et al., "A New Approach to Secure Logging," Transactions on Storage, Mar. 2009, vol. 5, No. 1, pp. 2:1-2:21 (16 Pages).
Ma D., et al., "Forward-Secure Sequential Aggregate Authentication," IEEE Symposium on Security and Privacy (SP'07), May 20, 2007, pp. 86-91 (10 Pages).
Ma D., "Practical Forward Secure Sequential Aggregate Signatures," Proceedings of the 2008 ACM Symposium on Information, Computer and Communications Security, Mar. 18, 2008, pp. 341-352.
Malkin T., et al., "Efficient Generic Forward-Secure Signatures with an Unbounded Number of Time Periods," Proceedings of the 21st International Conference on the Theory and Applications of Cryptographic Techniques (EUROCRYPT 2002), Springer-Verlag, 2002, pp. 400-417.
Mu Y., et al. "Compact Sequential Aggregate Signatures," Proceedings of the 2007 ACM Symposium on Applied Computing, Mar. 11, 2007, pp. 249-253 (6 Pages).
Munch J.P., et al., "VASA: Vector AES Instructions for Security Applications," Association for Computing Machinery, 2021, pp. 131-145.
Ozmen M.O., et al., "Energy-Aware Digital Signatures for Embedded Medical Devices," IEEE Conference on Communications and Network Security (CNS), Jun. 10, 2019, pp. 55-63 (10 Pages).
Pabbuleti K., et al., "Energy Budget Analysis for Signature Protocols on a Self-Powered Wireless Sensor Node," Radio Frequency Identification: Security and Privacy Issues: 10th International Workshop, Jul. 21-23, 2014, pp. 123-136 (11 Pages).
Rahman M., et al., "Security Vulnerabilities in Existing Security Mechanisms for IoMT and Potential Solutions for Mitigating Cyber Attacks," Springer International Publishing, Cham, 2021, pp. 307-334.
Rechberger C., et al., "Cryptanalysis of Low-Data Instances of Full LowMCv2," IACR Transactions on Symmetric Cryptology, 2018, vol. 3, pp. 163-181.
International Search Report and Written Opinion, mailed Dec. 19, 2023, received in connection with corresponding International Patent Application No. PCT/US2023/075133.

* cited by examiner

LIGHTWEIGHT, RESILIENT, AND AGGREGATE SYMMETRIC CRYPTOGRAPHIC TOOLS FOR INTERNET OF THINGS AND FORENSICS

CROSS-REFERENCE TO RELATED APPLICATIONS

This application is a U.S. National Stage Application filed under 35 U.S.C. § 371 of PCT/US2023/075133, filed Sep. 26, 2023, which claims priority to, and the benefit of, U.S. Provisional Patent Application No. 63/377,446, filed Sep. 28, 2022, both of which are incorporated herein by reference in their entirety.

STATEMENT REGARDING FEDERALLY SPONSORED RESEARCH

This invention was made with government support under Grant No. NSF-1917627 awarded by the National Science Foundation. The government has certain rights in the invention.

BACKGROUND

In an increasingly connected world, Internet of Things (IoT) systems integrated with next-generation wireless and distributed applications play a central role in cyber-systems. IoTs are often expected to harbor several thousand embedded devices, or more, many of which are highly resource-limited (e.g., medical embedded devices and smart home/smart city sensors). Yet, embedded IoT devices are generally expected to operate for long durations without interruptions, while gathering, processing, and transmitting data, which may be private or secure, in some cases. Therefore, it is of important to ensure the cybersecurity of emerging IoT systems. As an example, a resource-limited healthcare IoT application may include many different medical devices (e.g., embedded/wearable sensors, handheld tablets, etc.) that gather highly sensitive data from patients and report the collected data to other systems (e.g., operated by doctors, a hospital, insurance companies, etc.) for diagnosis and analysis. It is a highly challenging yet critical task to ensure the trustworthiness of such systems, which can produce massive amounts of sensitive information under resource limitations (e.g., battery, processor, memory) and in the presence of active adversaries.

SUMMARY

One implementation of the present disclosure is a method for encrypting a message transmitted between two or more computing devices. The method includes determining a current secret key that is shared between a first computing device and a second computing device, the second computing device being remote from the first computing device, calculating a current message authentication code (MAC) based on the current secret key and the message, calculating a subsequent secret key based on the current secret key using a one-way pseudorandom function, calculating a subsequent MAC by aggregating the current MAC and a first preceding aggregate MAC, and encrypting the message using the subsequent MAC and the subsequent secret key.

Another implementation of the present disclosure is a non-transitory computer readable medium having instructions stored thereon that, when executed by one or more processors, cause a computing device to determine a current secret key that is shared between the computing device and a remote computing device, calculate a current message authentication code (MAC) based on the current secret key for a message being transmitted from the computing device to the remote computing device, calculate a subsequent secret key based on the current secret key using a one-way pseudorandom function, calculate a subsequent MAC by aggregating the current MAC and a first preceding aggregate MAC, and encrypt the message using the subsequent MAC and the subsequent secret key.

Yet another implementation of the present disclosure is a method for encrypting a message transmitted between two or more computing devices. The method includes determining a current secret key that is shared between the two or more computing devices, calculating a current message authentication code (MAC) and a current ciphertext based on the current secret key and the message using authenticated encryption (AE), calculating a subsequent secret key based on the current secret key using a one-way pseudorandom function, calculating a subsequent MAC by aggregating the current MAC and a first preceding aggregate MAC, and encrypting the message using the subsequent MAC, the current ciphertext, and the subsequent secret key.

Additional features will be set forth in part in the description which follows or may be learned by practice. These features will be realized and attained by means of the elements and combinations particularly pointed out in the appended claims. It is to be understood that both the foregoing general description and the following detailed description are exemplary and explanatory only and are not restrictive, as claimed.

Figure 1:
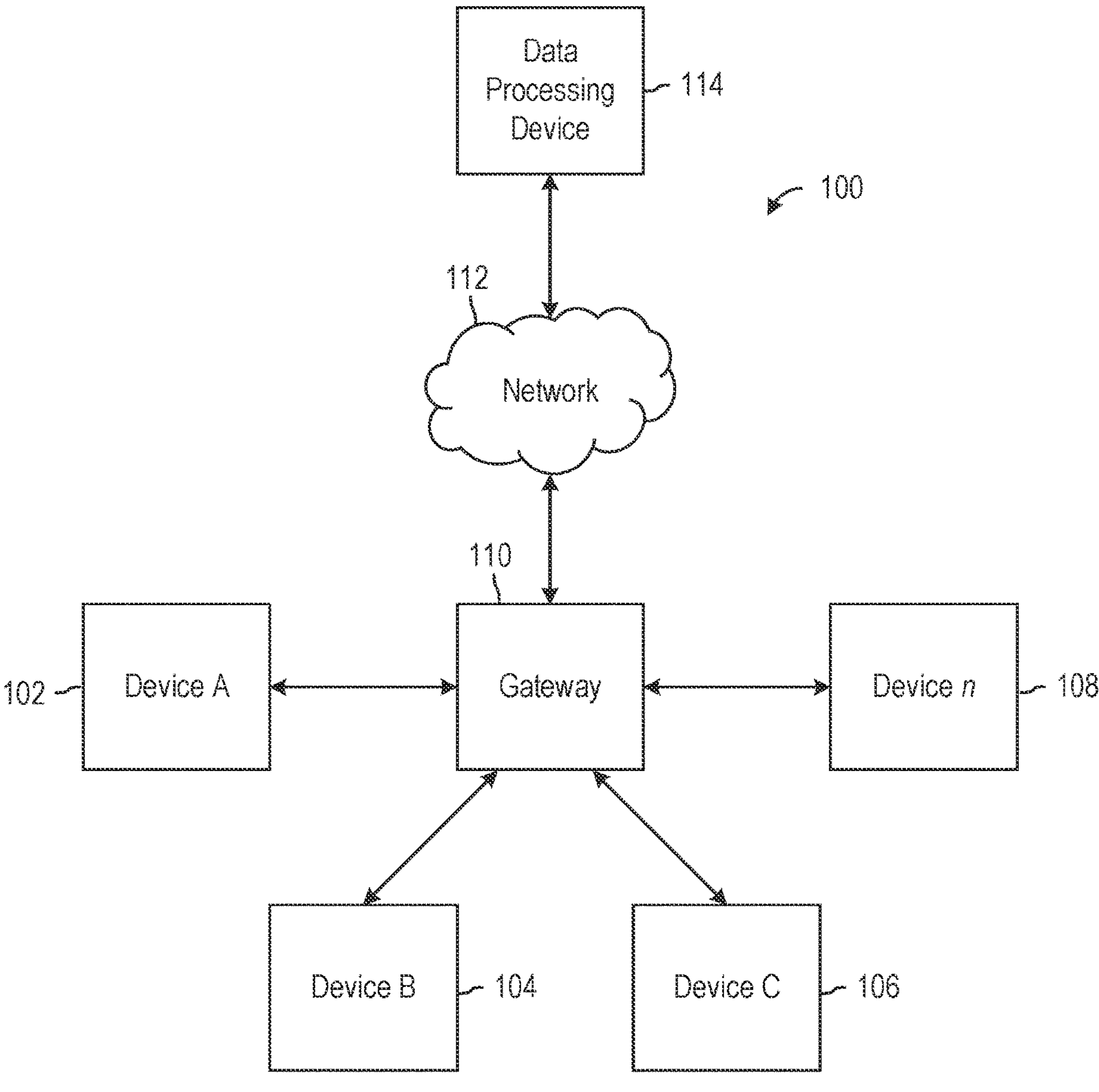
FIG. 1 is a block diagram of an example Internet of Things (IoT) system, according to some implementations.

Various objects, aspects, and features of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

In IoT systems, and indeed other computing systems, cryptographic mechanisms provide services such as authentication, integrity, and privacy of data communications. In some cases, cryptographic mechanisms can provide advanced security features, such as forward-security, lightweight cryptography, etc. Those of skill in the art will appreciate that cryptographic mechanisms for resource-limited IoTs should also offer compromise-resiliency, aggregation and holistic integrity, and efficiency. For example, attackers often target wireless devices to extract valuable information by breaching their system via malware infiltration or physical means. Hence, data protection should offer compromise-resiliency features such as forward-security, wherein the cryptographic protection prior to attack remains valid even if the current key is exposed. Cryptographic storage and transmission overhead can be substantial due to the high volume of sensitive data and logs generated by IoT devices. In some implementations, authentication tag (e.g., signature) aggregation can compress signatures, thereby mitigating overhead, which not only helps to ensure the integrity of individual data but also an entire data collection to prevent re-ordering and selective deletion. Moreover, would be desirable for these properties to be accompanied with not only forward-secure integrity but also with confidentiality.

As mentioned above, low-end IoT devices (e.g., embedded medical sensors, wearables, etc.) are often resource-limited, yet are expected to operate for long durations without replacement or maintenance. For example, IoT devices may be constrained by battery life requirements, memory size, processor speed, and the like. Thus, it is also desirable for cryptographic protection mechanisms to respect the resource limitations of IoT and wireless systems. In some implementations, desirable efficiency properties can include: highly lightweight cryptographic operations, such as only finite field arithmetic (e.g., small modular addition and multiplication) and/or symmetric pseudo-random function (PRF) calls; minimum memory print, including compact symmetric keys and small code base with simple cryptographic operations; small cryptographic tag sizes to minimize transmission overhead; and pre-computation and batch verification capabilities to enable delay-aware and mass processing.

In general, there are two main types of cryptographic techniques applied to IoT and wireless systems today: public key cryptography based solutions and symmetric cryptography based solutions. In public key cryptography based solutions, digital signatures and public key encryption rely on public key infrastructures (PKIs) for public verifiability and non-repudiation. However, PKIs generally incur a heavy overhead, especially when advanced security properties are considered. Traditional digital signatures (e.g., elliptic curve digital signature algorithm (ECDSA), Rivest-Shamir-Adleman (RSA), etc.) and public key cryptography (PKC) encryption have been used in the past to secure audit logs, but these basic approaches have several main limitations. For example, PKC-based signature and/or encryption generally requires computationally heavy operations (e.g., exponentiations, elliptic curve scalar multiplications, etc.) that are much more costly (e.g., in terms of computational requirements) than symmetric cryptography based approaches. Moreover, they do not offer advanced features such as forward-security and aggregation which enhance the security and compactness of sensitive data. Further, including these types of advanced features (e.g., forward-security and aggregation) greatly increases the cryptographic overhead, which might not be practical for resource-limited IoT applications.

As described herein, forward-security can help ensure the authenticity and integrity of data items by evolving a secret key periodically (e.g., per signing). Forward-secure signatures can substantially enhance breach resiliency and therefore have various applications in IoTs and forensics. However, forward-secure signatures introduce a new signature and/or public key per log entry, and therefore incur a high computation and storage/transmission overhead. Forward-Secure and Aggregate Signatures (FOSA) permit authentication tag aggregation that reduces the logger storage/transmission overhead. Some FOSA schemes also offer an "all-or-nothing" property, which helps to ensure the integrity of an entire log trail to prevent re-ordering and selective deletion. Various FOSA schemes have been developed with several performance and security trade-offs. Forward-Secure Sequential Aggregate Authentication (FssAgg) schemas were some of the first FOSA schemes, but FssAgg variants with sub-linear signature and public key sizes were flawed. FssAgg-BLS (Boneh-Lynn-Shacham) is a K-time signature scheme with O(K) public key size which also requires a cryptographic pairing per message verification, and therefore is computationally expensive. Blind-Aggregate-Forward (BAF) schemes have also been proposed but still require an O(K) public key size. In some implementations, a CORE scheme achieves sub-linear key and signature sizes; however, CORE schemas require multiple elliptic curve (EC) scalar multiplications both at the logger and verifier sides.

There are still other digital signatures (not explicitly described herein) that offer lightweight signing at the expense of assuming non-colluding public key generation servers. Despite their merits, these schemes still require several PRF and finite field operations proportional to the number of non-colluding servers at the signer and require a verifier to retrieve public keys from distributed servers. None of the aforementioned schemas consider public key encryption due to its additional expense. Moreover, as mentioned above, forward-secure encryption is computationally expensive, as it requires hierarchical identity-based encryption.

In contrast, many symmetric key-based techniques rely on Message Authentication Codes (MACs) and symmetric ciphers. Some symmetric key-based techniques offer forward-security, aggregation, and all-or-nothing properties that permit a high level of security/privacy for data. In some cases, these advanced security features (e.g., forward-security, aggregation, and all-or-nothing properties) are offered via a few Pseudo-Random Function (PRF) and/or cryptographic hash calls. Some techniques, such as Self-Sustaining Hash-Based Sequential Aggregate and Forward-Secure Signature (SU-HaSAFSS) offer forward-secure confidentiality on top of integrity, authentication and aggregation. These types of primitives are generally referred to herein as Forward-Secure and Aggregate Symmetric Primitives (FASPs). Symmetric primitives generally do not offer public verifiability and non-repudiation; however, they are magnitudes of times more efficient than their public key-based counterparts and therefore are, in some cases, currently a preferred choice for deployment on highly resource-limited IoT systems. Yet despite their advanced features, existing FASP schemes do not consider algebraic MACs and therefore do not leverage the benefits of their computational efficiency, compactness, and homomorphic features. Additionally, existing FASP schemes do not capture Authenticated Encryption (AE) modes and are not reflective of standardization efforts. Hence, there is a significant need for FASP schemes that can offer high efficiency, compactness, partial homomorphism, pre-computability, and batch processing while preserving their forward security and aggregation simultaneously.

Overview

Referring generally to a figures, a system and methods of constructing and implementing new cryptographic schemes that address these and other deficiencies of existing techniques are shown, according to various implementations. In particular, a new series of Forward-Secure and Aggregate Symmetric Primitives (FASP) schemes are described herein that offer partial homomorphism, pre-compatibility, and batch processing capabilities, while also being significantly more computationally efficient than existing FASP schemes, especially for compact message and key sizes. FASP sequentially encrypts, computes, and then compresses MACs to obtain a single aggregate MAC. Existing FASP schemes commonly use separate encryption and MAC processes with a hash-based key update mechanism.

This new series of cryptographic schemes is generally referred to herein as "Graphene" due to its lightweight nature and resilient features. One such Graphene scheme is referred to herein as "Graphene-AE," which is built from an Authenticated Encryption (AE) scheme. AE is a scheme that symmetrically encrypts a message, denoted as m, while also producing a MAC. An AE takes a private key (sk) and a message (m) as the input and produces a MAC ($\sigma$) and ciphertext (C) as the output, which can be represented as ($\sigma$, C)$\leftarrow$AE (sk, m). The decryption and verification processes follow similar logic. Another Graphene scheme described herein is "Graphene-UMAC," which harnesses the algebraic features of Universal MAC (UMAC) to build FASPs that are amenable to aggregation while also offering partial homomorphism and efficiency of finite field arithmetic operations for compact messages. UMAC relies on universal hash functions and one-time pads that use efficient arithmetic operations. UMACs are shown to be significantly more efficient than HMAC but require careful handling of one-time keys. Both Graphene-AE and Graphene-UMAC may offer unique features such as multi-MAC, pre-computability, and privacy-preserving authenticated aggregation.

In Graphene-AE, a FASP is constructed from AE by integrating key-evolving confidentiality and MAC processes under a single umbrella. Hence, conservatively, Graphene-AE is twice as efficient and half the size (in other words, more compact) when compared to existing FASP schemes that rely on separate encryption, MAC, and key update processes. Graphene-UMAC is the first FASP family that harnesses the efficiency and partial homomorphic properties of UMAC. All Graphene-UMAC schemes benefit from the computational efficiency of UMAC over their hash-based MAC variants, which has been shown to be significant thanks to their reliance on optimized field arithmetic. This benefit remains valid on any message sizes but particularly for compact messages. Graphene-UMAC is also significantly more efficient than existing FASP schemes for compact message and key sizes. Specifically, for message sizes equal or smaller than their modulo (e.g., $\mathbb{F}q$, where $|q|=256$), computing a forward secure and aggregate MAC requires only a few optimal field arithmetic operations plus a keyed Pseudo-Random Function (PRF) call. PRF is one of the most foundational cryptographic primitives. A PRF takes a private key sk and a message m as input and produces a random uniform (r) output, which can be represented as r$\leftarrow$PRF (sk, m). A PRF can be used as a key derivation and/or update function. A PRF can be derived from a symmetric cipher or a cryptographic hash function. Thus, Graphene-UMAC is vastly more efficient than HMAC-based FASPs, which generally require two separate hashes and then PRF call(s). For example, a Graphene-UMAC variant described below, Graphene-UMAC.SQH, offers a highly efficient signing for compact messages with only a modular squaring and addition per message before the PRF call.

Another Graphene-UMAC variant described below is Graphene-UMAC.LC, which offers additively homomorphic aggregation and is therefore much more efficient than hash-based aggregation in previous FASP schemes. Moreover, a partial homomorphic property benefits network coding and other additively aggregate applications (e.g., vote counting). Graphene-UMAC.LC can be integrated with additively homomorphic encryption variants for small message spaces. Graphene-UMAC further allows for pre-computation of one-time algebraic keys at the offline phase, which increases efficiency during online signing. Moreover, Graphene-UMAC.LC enables batch verification with forward-security even if the same message is signed with distinct keys.

The Graphene framework described herein encapsulates various extended features that were not available in previous FASP constructions. For example, Graphene schemes can optionally incorporate error correction codes and/or secret sharing schemes, which interplays with the partial homomorphic properties of some Graphene constructions. Graphene-UMAC schemes are particularly tailored for distributed execution in secure multi-party computation settings, which makes them an ideal choice for a breach-resilient framework in which the verifier/decryptor functionalities are not only forward-secure but also distributed. The algebraic nature of Graphene-UMAC makes these schemes much more efficient for distributed execution compared to HMAC or symmetric PRF approaches. It will be appreciated that the various Graphene schemes described herein can be instantiated with any AE and/or UMAC primitive. Hence, instantiations Graphene-AE and Graphene-UMAC with LCH/SQH, respectively, are only representative examples. It will also be appreciated that, while the current standard security level is considered $\kappa=128$ (e.g., standard modulo size $|q|=256$, 128), the security level and parameter sizes may be updated depending on the computational capabilities of the adversary.

Thus, as briefly described above, and as will be made evident with reference to the figures and related description herein, Graphene schemes are particularly well-suited for use in resource limited IoT device that needs, or would benefit from, symmetric key cryptography. The disclosed Graphene schemes offer forward-secure and aggregation, and therefore can provide compromise-resiliency and compact transmission for applications, in which the sender collect data and periodically reports it to the collector. Examples of such implementations include smart home and city IoT applications, where sensors collect data from an environment and periodically report to a cloud server or other remote computing device (e.g., a "hub").

Similarly, low-cost widely deployable sensors on the Internet of Battlefield (IoBT) collect intelligence which is uploaded to a collector (e.g., a drone, an unmanned mobile vehicle, a command center, etc.). In each of these settings, sensors operate in an open environment that makes them vulnerable to software or physical breaches. The forward-security and aggregation properties of Graphene can help to mitigate and/or prevent breaches and storage/transmission overhead of cryptographic tags. Another use-case example for Graphene is in medical embedded devices. Graphene with MAC aggregation, for example, can be used in systems with the low computational overhead with compact tag sizes. Yet another use-case example for Graphene schemes are time-valid broadcast applications, in which a center (e.g., satellite, drone, infrastructure, etc.) broadcasts measurements and/or commands that must be quickly verified by receivers.

Notations

Before describing the figures in detail, various notations are presented herein for clarity. Additional notations may be presented throughout this disclosure.

Operators $\|$ and $|x|$ denote concatenation and the bit length of variable x, respectively.

$x \stackrel{\$}{\leftarrow} S$ denotes that variable x is randomly selected from the finite set S using a uniform distribution.

$|S|$ denotes the cardinality of set S.

$\{0,1\}^*$ denotes the set of binary strings of any finite length.

$$\{x_i\}_{i=0}^{n-1}$$

denotes the set of items $(x_1, x_2, \ldots, x_n)$.

log x is $\log_2$ x.

κ denotes the security parameter.

q is a large prime (e.g., $|q|=256$).

$Add_q$, $Mul_q$, and ⊕ denote multiplication and addition in $\mathbb{F}q$ and XOR, respectively.

m represents a message to be processed.

$H(m)$: $\{0, 1\}^* \rightarrow \{0, 1\}^h$ is a cryptographic hash function where h and h' are the output bit length and block size of the hash function, respectively. If $|m|>h'$ then m is split into multiple chunks of size h' to be processed with a proper padding pad.

HMAC denotes Hash-based Message Authentication Code (HMAC). HMAC takes a private key sk and a message m as the input, and produces an authentication tag (e.g., signature) as the output, which can be represented as $\sigma \leftarrow$HMAC (m, sk). A description of HMAC is:

$$HMAC(sk, M) = H((sk \oplus opad) \| H((sk \oplus pad) \| M)),$$

where $|sk|=h$ and (opad, ipad) are appropriate paddings. In some implementations, the verifier repeats the process and checks if the authentication tag matches.

E and D denote encryption and decryption with a symmetric cipher, such as Advanced Encryption Standard (AES). The encryption takes a private key sk and a message m as the input and produces a ciphertext C as the output, which can be represented as $C \leftarrow E(sk, m)$. For a message larger than the block size of the cipher, an appropriate mode of operation is used.

The execution time efficiency comparison of the above operations, for a similar (e.g., single) block (input) size, key and modulo sizes, in many computer architectures, can be approximated as follows:

$$HMAC \gg H > AE > \frac{E}{D} \gtrsim PRF \gg Mul_q \gtrsim Sqr_q \gg \text{Add}_q \gg \bigoplus$$

IoT System

Referring now to FIG. 1, a block diagram of an example Internet of Things (IoT) system 100 is shown, according to some implementations. An IoT system, such as system 100, generally includes a plurality of physical objects with embedded sensors and/or processing capabilities, referred to herein as "IoT-enabled devices," that are communicably coupled such that each device can send data to and/or receive data from other devices in the system. In the example shown in FIG. 1, devices 102-108 (e.g., "Device A" through "Device n") are IoT-enable devices. It should be appreciated that system 100 may include any number of IoT-enabled devices. Devices 102-108 generally represent any IoT-enabled or "smart" device, such as smart home devices (e.g., appliances, lights, blinds, smart speakers, etc.), surveillance devices (e.g., security cameras, speakers, alarms, smoke detectors, etc.), medical devices (e.g., heart rate monitors, pacemakers, hearing aids, fitness trackers, etc.), and the like. Each of devices 102-108 generally include at least one sensor for collecting data and a communication interface for transmitting the collected data. In some implementations, any of devices 102-106 may also be configured to receive data via the communication interface. In some implementations, any of device 102-106 can also include a processing unit (e.g., a processor and memory) for processing the collected data. An example IoT device, such as one of devices 102-108, is described in detail below with respect to FIG. 2.

In some implementations, such as in the example shown, devices 102-108 may each communicate with (e.g., send data to and/or receive data from) a gateway 110. Gateway 110, also referred to as a "hub," is a centralized computing device that connects devices 102-108 to a data processing device 114 for off-site or remote processing. In some implementations, gateway 110 also facilitates device-to-device communications (e.g., such that "Device A" can communicate with "Device B"), such as by translating and/or routing data. Accordingly, gateway 110 generally includes a communications interface for facilitating wired and/or wireless communications, and may also include processing circuitry (e.g., a processor and memory). For example, gateway 110 may include a wireless transceiver (e.g., a Wi-Fi transceiver) for receiving data from each of devices 102-108 and may include an Ethernet jack for communicating with data processing device 114. As described herein, devices 102-108 are generally configured to send "messages" to gateway 110 and/or to another one of devices 102-108, and in some cases may receive messages from other components of system 100. A "message" is a data packet, such as a limited amount of collected sensor data, device parameters, etc. Likewise, gateway 110 may send/receive messages to/from data processing device 114.

Data processing device 114 is generally any computing device that is suitable for receiving data collected by devices 102-108 and processing the collected data in some manner. In some implementations, data processing device 114 is a server, a workstation, or any other computer. For example, data processing device 114 may be a cloud server that gateway 110 sends collected device data to for processing. In some implementations, data processing device 114 simply stores and/or maintains the collected data. In other implementations, data processing device 114 processes the data to generate reports or alerts, to initiate actions, etc. In some implementations, gateway 110 communicates with remote computing device 114 via a network 112. Generally, network 112 is any suitable wired or wireless network over which data can be communicated between two or more computing devices. For example, network 112 may be a cellular network, a local or personal area network (LAN/PAN), a mesh network, a virtual private network (VPN), a wide area network (WAN) (e.g., the Internet), or the like.

As those in the art will appreciate, cybersecurity is highly important in IoT systems. In system 100, for example, devices 102-108 may be vulnerable to physical and/or digital attacks (e.g., malware) in which malicious actors attempt to extract valuable information (e.g., the data collected by each of devices 102-108). In some cases, attackers may attempt to inject false or malicious data at various points in system 100 in order to install malware, access data processing device 114, and the like. Thus, the Graphene encryption schemes described herein may be implemented on any of the components of system 100 (e.g., devices 102-108, gateway 110, and/or data processing device 114) in order to protect data. Specifically, devices 102-108 and gateway 110, and in some cases data processing device 114, may each implement a Graphene scheme to encrypt data before it is transmitted to another component of system 100. Likewise, a component of system 100 that receives encrypted data may implement Graphene to decrypt the received data.

Figure 2:
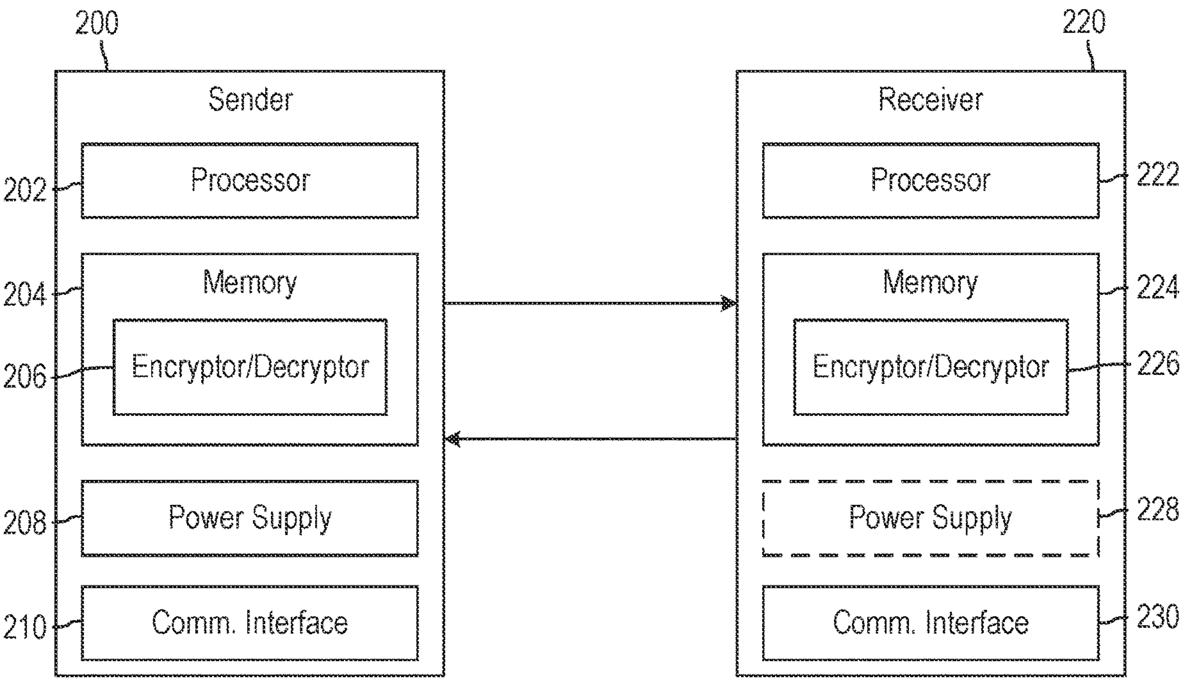
FIG. 2 is a block diagram showing communication between two or more IoT devices, according to some implementations.

Referring now to FIG. 2, a block diagram illustrating communication between two or more IoT devices is shown, according to some implementations. In particular, FIG. 2 may illustrate communication between any two of devices 102-108 and/or between one of devices 102-108 and gateway 110. Likewise, in some cases, FIG. 2 may illustrate communication between gateway 110 and data processing device 114. Accordingly, sender 200 and receive may each be any one of devices 102-108, gateway 110, or data processing device 114. For example, sender 200 may be device 102 and receiver 220 may be gateway 110.

As shown, sender 200 generally includes a processor 202 and memory 204. Likewise, receiver 220 may also include a processor 222 and memory 224. Processors 202, 222 can be any general-purpose processor, an application specific integrated circuit (ASIC), one or more field programmable gate arrays (FPGAs), a group of processing components, or other suitable electronic processing components. In some implementations, processors 202, 222 are configured to execute program code stored on respective memory 204, 224 to cause sender 200 or receiver 220 to perform one or more operations. While not shown, in some implementations, processors 202, 222 and memory 204, 224 may be components of respective processing circuits and/or may be communicably coupled via a processing circuit.

Memory 204, 224 can include one or more devices (e.g., memory units, memory devices, storage devices, etc.) for storing data and/or computer code for completing and/or facilitating the various processes described in the present disclosure. In some implementations, memory 204, 224 includes tangible, computer-readable media that stores code or instructions executable by a corresponding one of processors 202, 222. Tangible, computer-readable media refers to any media that is capable of providing data that causes sender 200 or receiver 220 (i.e., a machine) to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 204, 224 can include random access memory (RAM), read-only memory (ROM), hard drive storage, temporary storage, non-volatile memory, flash memory, optical memory, or any other suitable memory for storing software objects and/or computer instructions. Memory 204, 224 can include database components, object code components, script components, or any other type of information structure for supporting the various activities and information structures described in the present disclosure.

While shown as individual components, it will be appreciated that processors 202, 222 and/or memory 204, 224 can be implemented using a variety of different types and quantities of processors and memory. For example, processor 202 may represent a single processing device or multiple processing devices. Similarly, memory 204 may represent a single memory device or multiple memory devices. Additionally, in some implementations, sender 200 and/or receiver 220 may be implemented within a single computing device (e.g., one server, one housing, etc.). In other implementations, sender 200 and/or receiver 220 may be distributed across multiple servers or computers (e.g., that can exist in distributed locations). For example, receiver 220 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

As shown, memory 204, 224 may each include an encryptor/decryptor 206, 226. For simplicity's sake, only encryptor/decryptor 206 is described herein in detail; however, it should be appreciated that encryptor/decryptor 226 may be functionally equivalent to, or the same as, encryptor/decryptor 206. Encryptor/decryptor 206 is generally configured to encrypt data for communication to receiver 220 and/or to decrypt data received from receiver 220. In particular, encryptor/decryptor 206 may implement the Graphene schemes described herein to perform said encryption/decryption. At a high level, when sender 200 is preparing to send a message to receiver 220 (e.g., containing collected sensor data), encryptor/decryptor 206 is configured to determine an initial or current secret key shared between sender 200 and receiver 220, and to use the initial or current secret key to calculate a current MAC and, in some cases, a ciphertext, for encrypting the message. Then, encryptor/decryptor 206 may calculate a subsequent or "next" secret key based on the initial or current secret key and may also calculate a subsequent or "next" MAC. In some implementations, the subsequent MAC is an aggregate of the current MAC and a previous aggregate MAC (e.g., associated with the most recently transmitted or received message). With the subsequent MAC and secret key (and optionally the current ciphertext), encryptor/decryptor 206 may encrypt the message such that the message can be sent to receiver 220. By performing similar steps, receiver 220 may then decrypt the message and may optionally generate, encrypt, and send a response. In this manner, sender 200 and receiver 220 may continuously or regularly communicate.

In some implementations, each of sender 200 and receiver 220 may include a respective power supply 208, 228. Power supplies 208, 228 may be batteries, capacitors (e.g., supercapacitors), or the like, or may be configured to source electrical energy from a wall outlet or other power source. In some implementations, where sender 200 is one of devices 102-108 (e.g., an edge device or IoT-enable device that collects data), sender 200 may include a battery, whereas receiver 220 may include a plug-in power supply, or vice versa. Each of sender 200 and receiver 220 may also include respective communications interfaces 210, 230 that facilitate communications between the devices and/or with external devices. Communications interfaces 210, 230 can be or can include a wired or wireless communications interface (e.g., jacks, antennas, transmitters, receivers, transceivers, wire terminals, etc.) for conducting data communications. In various implementations, communications via communications interfaces 210, 230 may be direct (e.g., local wired or wireless communications) or via a network (e.g., a WAN, the Internet, a cellular network, etc.), such as network 112. For example, one or both of communications interfaces 210, 230 can include a Wi-Fi transceiver for communicating via a wireless communications network. In another example, communications interfaces 210, 230 may include cellular or mobile phone communications transceivers. In yet another example, communications interfaces 210, 230 may include a low-power or short-range wireless transceiver (e.g., Bluetooth®).

Graphene-AE

Figure 3:
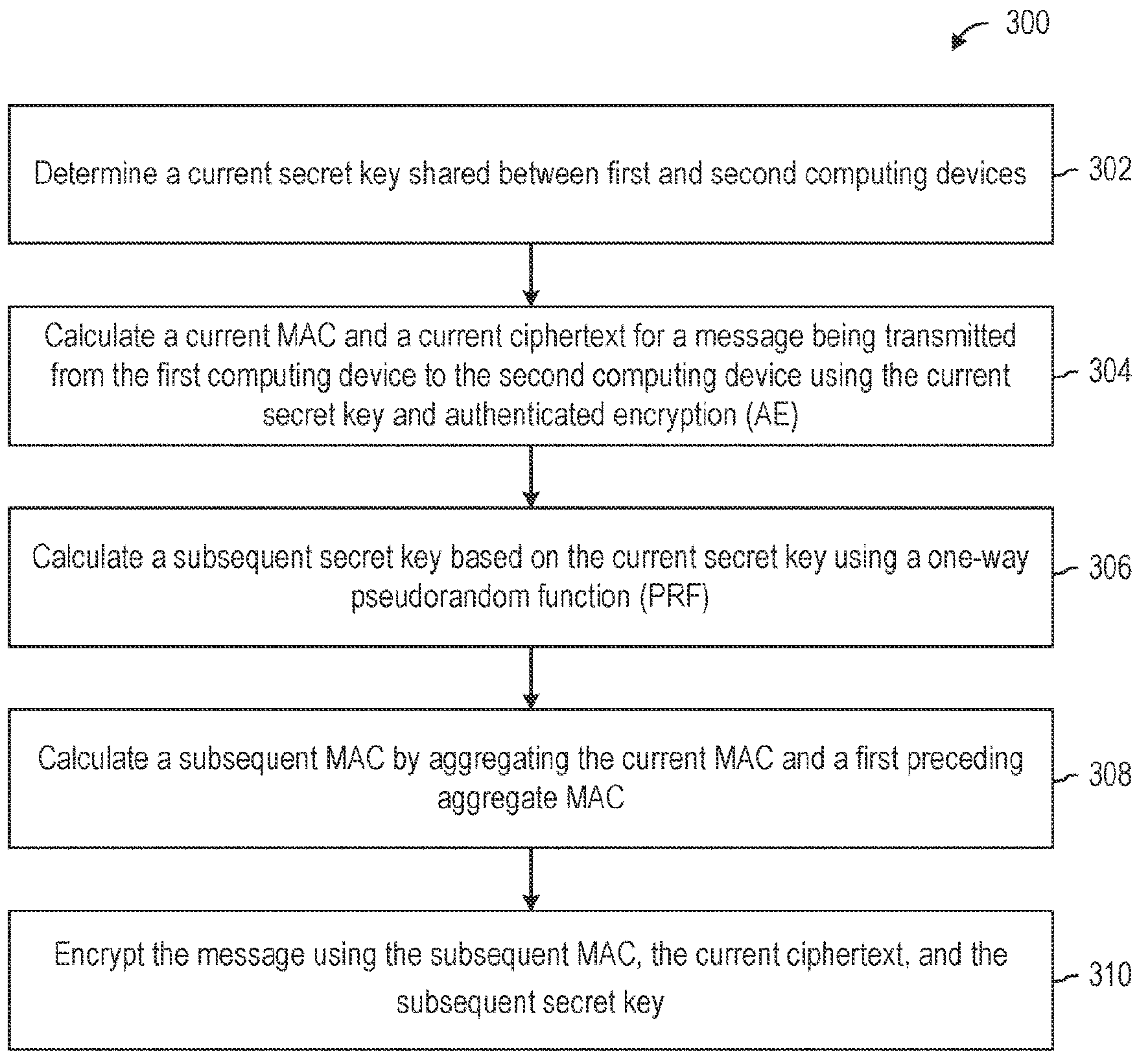
FIG. 3 is a flow diagram of process for encrypting a digital message using a first type of Graphene scheme, according to some implementations.

Referring now to FIG. 3, a flow diagram of process 300 for encrypting a digital message using a first type of Graphene scheme is shown, according to some implementations. This "first" type of Graphene scheme is generally referred to herein as Graphene-AE, as introduced above. As discussed above, Graphene-AE is built from an AE scheme that symmetrically encrypts a message, m, while also producing a MAC. Specifically, AE takes a private key, sk, and a message, m, as an input and produces a MAC, σ, and ciphertext, C, as the output, which can be represented as (σ, C)←AE (sk, m). The decryption and verification processes follow similar logic; thus, it should be appreciated that process 300 is generally a "sender" process (e.g., the device sending a message, such as sender 200) as the receiver (e.g., receiver 220) generally follows a similar process starting with private key $sk_{j+1}$. Accordingly, process 300 may be implemented by sender 200 and/receiver 220, as described above. It will be appreciated that certain steps of process 300 may be optional and, in some implementations, process 300 may be implemented using less than all of the steps. It will also be appreciated that the order of steps in process 300, as shown in FIG. 3, is not intended to be limiting.

For clarity, process 300 is described herein for a message $m_j \in \{0, 1\}^*$. It can be assumed, for this example, that an initial secret key that is shared between the sender and receiver can be defined as $sk_1 \overset{\$}{\leftarrow} \{0, 1\}^{\kappa}$. st is an internal state that maintains previously processed values and counters, where st=($c_1$, $c_2$, . . . , $c_{j-1}$) are ciphertexts, c, of previously collected messages ($m_1$, $m_2$, . . . , $m_{j-1}$) encrypted using secret keys ($sk_1$, $sk_2$, . . . , $sk_{j-1}$) using an AE scheme. $\sigma_{1,j-1}$ is an aggregate MAC that was computed sequentially on individual MACs of st.

At step 302, a current secret key ($sk_j$) shared between first and second computing devices is determined. In some implementations, such as when process 300 is initiated for a first message (m) sent from a first computing device to a second computing device, the "current" secret key is the initial secret key ($sk_1$). In other implementations, the current secret key ($sk_j$) is the last or most recent secret key calculated by either the first or second computing devices. For example, the current secret key ($sk_j$) may be the secret key used to encrypt a last message communicated between the first and second computing devices.

At step 304, a current MAC and a current ciphertext for the message are calculated authenticated encryption (AE) based on the current secret key. In particular, the current MAC and current ciphertext may be calculated as:

$$(\sigma_j, c_j) \leftarrow AE(sk_j, m_j)$$

where $\sigma_j$ is the current MAC, $c_j$ is the current ciphertext, $m_j$ is the message, and $sk_j$ is the current secret key. Optionally, an explicit order enforcement can be done as $m_j \| j$ and/or by annexing a time stamp, $ts_j$, as $m_j \| ts_j$. In some implementations, per item mode signs every single message separately. In some implementations, per time period mode signs all messages collected in a given time period as a single message.

At step 306, a subsequent secret key is calculated based on the current secret key using a one-way pseudorandom function (PRF). The subsequent secret key can be calculated as:

$$sk_{j+1} \leftarrow UPD(sk_j)$$

where $sk_j$ is the current secret key, $sk_{j+1}$ is the subsequent secret key, and UPD is the one-way PRF. In some implementations, UPD can be obtained from a symmetric PRF or a cryptographic hash function.

At step 308, a subsequent MAC is calculated by aggregating the current MAC and a first preceding aggregate MAC. In some implementations, the subsequent aggregate MAC can be calculated as:

$$\sigma_{1,j+1} \leftarrow \sigma_j \circ \sigma_{1,j-1}$$

where $\sigma_j$ is the current MAC, $\sigma_{1,j-1}$ is the first preceding aggregate MAC, $\sigma_{1,j+1}$ is the subsequent MAC, and · is an aggregation operator. In some implementations, $\sigma_j$ and $\sigma_{1,j-1}$ are deleted from a memory (e.g., memory 204) of the first computing device (e.g., the computing device performing process 300) after calculating the subsequent MAC to save memory space.

It will be appreciated that various aggregation modes are contemplated herein, each of which may have unique advantages for different applications of process 300. A first aggregation mode can be defined as:

$$\sigma_{1,j+1} \leftarrow H(\sigma_j \| \sigma_{1,j-1})$$

where H is a cryptographic hash function. A second aggregation mode can be defined as:

$$\sigma_{1,j+1} \leftarrow \sigma_j \oplus \sigma_{1,j-1}$$

where ⊕ is a direct sum function. A third aggregation mode can be defined as:

$$\sigma_{1,j+1} \leftarrow PRF(\sigma_j \oplus \sigma_{1,j-1}, sk_j)$$

where PRF is a pseudorandom function.

As described above, these Graphene-AE aggregation modes are generally more efficient than that of existing FASP schemes. The second aggregation mode, for example, uses a single XOR operation to aggregate two MACs. In contrast, many current FASP utilize only the first aggregation mode, which makes a cryptographic hash call on two blocks of input. Hence, the second aggregation mode is much more computational efficient than the first aggregation mode. The second aggregation mode is also XOR homomorphic, which can be useful in certain applications. In some implementations, such as when XOR homomorphism is not desirable (e.g., for mutability strategies), the third aggregation mode may be desirable. In the third aggregation mode, an XOR aggregated MAC is signed with a keyed PRF, which eliminates the algebraic structure while making only a single PRF call to one block of input. Therefore, the third aggregation mode may be up to two times faster than the first aggregation mode (e.g., used by many existing FASPs).

At step 310, the message is encrypted using the subsequent MAC, the current ciphertext, and the subsequent secret key. Subsequently, the encrypted message may be transmitted to the second computing device (e.g., receiver 220). As mentioned above, the second computing device (e.g., the receiving device) may then implement process 300 to decrypt the message.

As mentioned above, existing FASP schemes typically use HMAC and symmetric encryption separately. Often, a separate secret key must be used for HMAC and symmetric cipher. Therefore, existing FASP approaches require two key updates, at minimum one update call on two blocks of input, and sequential execution of HMAC and symmetric encryption. As demonstrated herein, Graphene-AE relies on AE to jointly execute both MAC and encryption processes that use a single secret key. Hence, an update to only one key (e.g., a PRF call on single block) is needed before running AE, which is more efficient than separate and sequential call of HMAC and symmetric cipher. For example, AE schemes are generally more efficient than HMAC, plus two hash calls, plus a separate symmetric cipher call.

Graphene-UMAC

Figure 4:
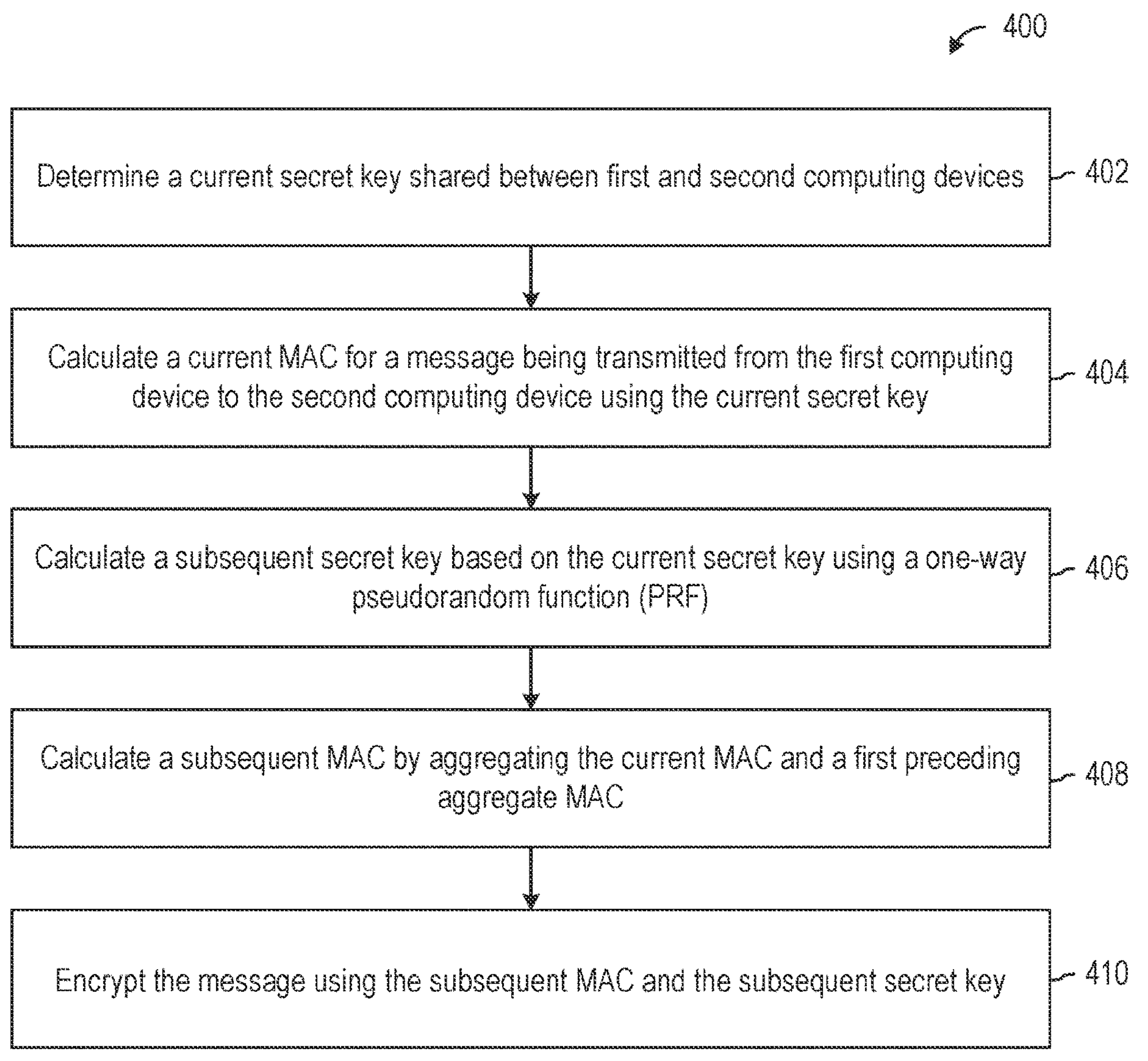
FIG. 4 is a flow diagram of process for encrypting a digital message using a second type of Graphene scheme, according to some implementations.

Referring now to FIG. 4, a flow diagram of process 400 for encrypting a digital message using a second type of Graphene scheme is shown, according to some implementations. This "second" type of Graphene scheme is generally referred to herein as Graphene-UMAC, as introduced above. In particular, two different Graphene-UMAC variations are represented by process 400, including Graphene-UMAC.LC and Graphene-UMAC.SQH, described in detail below. As with process 300, it will be appreciated the decryption and verification processes for a message encrypted using process 400 may follow similar logic; thus, it should be appreciated that process 400 is generally a "sender" process (e.g., the device sending a message, such as sender 200) as the receiver (e.g., receiver 220) generally follows a similar process. Accordingly, process 400 may be implemented by sender 200 and/receiver 220, as described above. It will be appreciated that certain steps of process 400 may be optional and, in some implementations, process 400 may be implemented using less than all of the steps. It will also be appreciated that the order of steps in process 400, as shown in FIG. 4, is not intended to be limiting.

As mentioned above, Graphene-UMAC generally harnesses UMAC for an efficient and compact FASP with advanced functionalities. Unlike Graphene-AE, described above, Graphene-UMAC focus on MAC computation without encryption. UMAC schemes are, by design, generally amenable to aggregation thanks to their algebraic properties. Moreover, UMAC schemes rely on one-time keys, which is a feature that is compatible with forward-security. Hence, UMAC schemes can be a desirable "building block" to construct FASP schemes. To this point, Graphene-UMAC is highly efficient for signing short messages (e.g., $m \in \mathbb{F}_q$); often, magnitudes faster than existing FASPs. Further, Graphene-UMAC can be instantiated from any UMAC scheme. Contemplated herein are two versions of Graphene-UMAC, respectively referred to as Graphene-UMAC.LC and Graphene-UMAC.SQH. However, those of skill in the art will appreciate that the properties of these instantiations are applicable to other UMAC families with similar algebraic features.

Graphene-UMAC.LC: Graphene-UMAC.LC, as described herein, is built from linear congruent hash (LCH), which is a universal hash function. Graphene-UMAC.SQH relies on square hash (SQH). For simplicity, Graphene-UMAC.LC is described first with respect to process 400 and Graphene-UMAC.SQH is described in greater detail thereafter. Thus, for the following discussion of Graphene-UMAC.LC, let st=(q, κ, j) be a large prime, security parameter, and state counter, respectively. The secret key, of format $sk=\{a, b\} \in \mathbb{F}_q$, is comprised of random elements of $\mathbb{F}_q$, where the initial secret key is $$sk_1 = \{a_1, b_1\} \overset{\$}{\leftarrow} \mathbb{Z}_q^*.$$

UPD is set as UPD: $\mathbb{F}_q \rightarrow \mathbb{F}_q$ that can be implemented with a PRF of suitable block/key length or a Full Domain Hash (FDH) function. $\sigma_{1,j-1}$ is an aggregate MAC that was computed sequentially on individual MACs of previously collected messages $(m_1, m_2, \ldots, m_{j-1})$.

At step 402, a current secret key ($sk_j$) shared between first and second computing devices is determined. In some implementations, such as when process 400 is initiated for a first message (m) sent from a first computing device to a second computing device, the "current" secret key is the initial secret key ($sk_1$). In other implementations, the current secret key ($sk_j$) is the last or most recent secret key calculated by either the first or second computing devices. For example, the current secret key ($sk_j$) may be the secret key used to encrypt a last message communicated between the first and second computing devices.

At step 404, a current MAC for the message is calculated based on the current secret key. In particular, the current MAC may be calculated as:

$$\sigma_j \leftarrow a_j \cdot m_j + b_j \bmod q$$

when $m_j \in \mathbb{F}_q$, where $a_j$ and $b_j$ are polynomials that define the current secret key, $m_j$ is the message, and q is a large prime. Otherwise, if $m \notin \mathbb{F}_q$, then $m_j$ is first mapped into $\mathbb{F}_q$ by applying one of a full domain hash (FDH) or a universal hash, and then the current MAC is calculated. Optionally, an explicit order enforcement and/or immutable aggregation modes of Graphene-AE can be applied. An explicit order enforcement can be done as $m_j \| j$ and/or by annexing a time stamp, $ts_j$, as $m_j \| ts_j$.

At step 406, a subsequent secret key is calculated based on the current secret key using a one-way pseudorandom function (PRF). More specifically, the polynomials that define the subsequent secret key can be calculated as:

$$(a_{j+1} \| b_{j+1}) \leftarrow UPD(a_j \| b_j)$$

where $a_j$ and $b_j$ are polynomials that define the current secret key and UPD is the one-way pseudorandom function. Additionally, $a_j$ and $b_j$ may be deleted from a memory of the device (e.g., the first computing device, or sender 200) that is performing process 400 in order to save memory space.

At step 408, a subsequent MAC is calculated by aggregating the current MAC and a first preceding aggregate MAC. In some implementations, the subsequent aggregate MAC can be calculated as:

$$\sigma_{1,j+1} \leftarrow \sigma_j + \sigma_{1,j-1} \bmod q$$

where $\sigma_j$ is the current MAC, $\sigma_{1,j-1}$ is the first preceding aggregate MAC, and $\sigma_{1,j+1}$ is the subsequent MAC. In some implementations, $\sigma_j$ and $\sigma_{1,j-1}$ are deleted from a memory (e.g., memory 204) of the first computing device (e.g., the computing device performing process 400) after calculating the subsequent MAC to save memory space.

At step 410, the message is encrypted using the subsequent MAC and the subsequent secret key. Subsequently, the encrypted message may be transmitted to the second computing device (e.g., receiver 220). As mentioned above, the second computing device (e.g., the receiving device) may then implement process 400 to decrypt the message.

Graphene-UMAC.SQH: As mentioned above, using Graphene-UMAC.SQH to encrypt or decrypt a message generally follows a similar process to that of process 400 for Graphene-UMAC.LC. Thus, the following description of Graphene-UMAC.SQH may be best understood with reference back to FIG. 4. However, for Graphene-UMAC.SQH, the secret key may be formatted as $sk=a\in\mathbb{F}_q$, wherein the initial secret key is defined as $$sk_1 = a_1 \overset{\$}{\leftarrow} \mathbb{Z}_q^*.$$

The values of st, UPD, and $\sigma_{1,j-1}$ may be initialized as in Graphene-UMAC.LC.

After a current secret key is determined (e.g., as in step 402 of process 400), the current MAC may be calculated (e.g., as in step 404 of process 400) as:

$$\sigma_j \leftarrow (a_j + m_j)^2 \bmod q$$

when $m_j\in\mathbb{F}_q$, where $a_j$ is a polynomial that defines the current secret key, $m_j$ is the message, and q is a large prime. Otherwise, if $m_j\notin\mathbb{F}_q$, then m, is first mapped into $\mathbb{F}_q$ by applying one of a full domain hash (FDH) or a universal hash, and then the current MAC is calculated. Optionally, an explicit order enforcement and/or immutable aggregation modes of Graphene-AE can be applied. An explicit order enforcement can be done as $m_j\|j$ and/or by annexing a time stamp, $ts_j$, as $m_j\|ts_j$.

Next (e.g., as in step 406 of process 400), the subsequent secret key is calculated as:

$$a_{j+1} \leftarrow UPD(a_j)$$

where UPD is the one-way pseudorandom function. Additionally, $a_j$ may be deleted from a memory of the device (e.g., the first computing device, or sender 200) that is performing process 400 in order to save memory space.

A subsequent MAC is then calculated (e.g., as in step 408 of process 400) as:

$$\sigma_{1,j+1} \leftarrow \sigma_j + \sigma_{1,j-1} \bmod q$$

where $\sigma_j$ is the current MAC, $\sigma_{1,j-1}$ is the first preceding aggregate MAC, and $\sigma_{1,j+1}$ is the subsequent MAC. In some implementations, $\sigma_j$ and $\sigma_{1,j-1}$ are deleted from a memory (e.g., memory 204) of the first computing device (e.g., the computing device performing process 400) after calculating the subsequent MAC to save memory space. Finally, the subsequent MAC and the subsequent secret key can be used to encrypt/decrypt a message.

As mentioned above, Graphene-UMAC is particularly well-suited for compact messages (e.g., $m\in\mathbb{F}_q$), since Graphene-UMAC generally only uses $Mul_q+Add_q$ for a signing operation. Additionally, Graphene-UMAC may be suited for signing compact messages with small security parameters. For example, a controller area network (CAN) bus in vehicles (e.g., over which Electronic Control Units (ECUs) communicate) is generally highly limited in capacity; hence, only a small tag size (e.g., 32-bit) may be allocated to MAC and/or error correction codes. Similarly, in some broadcast applications, temporal security is needed in the duration of a time-valid application. For instance, a control or measurement message broadcast (e.g., by a system controller or drone) might only need to remain secure until it is received and processed by an actuator (e.g., a message life span of a minute or so). After the command/measurement is processed in real-time, the transmitted package does not need to remain unforgeable. Smaller security parameters, such as κ=32, 64, are often sufficient for such time-valid applications. Hence, a smaller modulo (e.g., |q|=κ) may be used to obtain smaller tag sizes and higher computational efficiency.

In Graphene-UMAC, a small prime modulo can be used while leveraging various benefits of efficient small integer arithmetic (e.g., native to many CPUs) and maintaining security (e.g., κ=32-bit with the efficiency of 32-bit $\mathbb{F}_q$ arithmetic) thanks to the properties of universal hashes. Furthermore, a single UPD call can generate multiple smaller keys that can be used in the subsequent MAC operations. For instance, using |q|=32 and Blake256 as a UPD function, four $(a, b)\in\mathbb{F}_q$ can be derived, while a faster AES-128 as UPD still offers two keys to be used in the following MAC operations. UMACs have also been shown to be more efficient than HMAC for larger messages (e.g., |m|>|q|). Therefore, Graphene-UMAC may be more efficient than existing FASP schemes even for large messages, while being multiple times more computationally efficient for compact messages and modulo as described above.

In some implementations, there are applications in which a sender (e.g., sender 200) may continuously sample a single message for extended time periods. For example, a sensor that measures movement in an office building security application may continuously measure a single outcome (e.g., no moving object) on the weekends or during a holiday. For periodic measurements, the sensor may compute MACs on the same message but with different keys to achieve forward security. Graphene-UMAC.LC may permit a batch verification of forward-secure and aggregate MACs when a single message is signed with distinct private keys. For example, assuming that a sender device computes a forward-secure MAC on the same message $m\in\mathbb{F}_q$ for each time period ($t_1, t_2, \ldots, t_p$) with a distinct secret key ($sk_1, sk_2, \ldots, sk_L$), a receiver can pre-compute $$A=\sum_{i=1}^{L} a_i \bmod q \text{ and } B=\sum_{i=1}^{L} b_i \bmod q,$$

since UMAC keys are independent of the message.

The final aggregate MAC of the sender is $$\sigma_{1,L}=\sum_{i=1}^{L} a_i\cdot m+\sum_{i=1}^{L} b_i \bmod q.$$

When the receiver receives the message and MAC pair (e.g., m, $\sigma_{1,L}$), it can verify by checking if $\sigma_{1,L}$==A·m+B mod q holds. A key feature is that the verification requires only a single $Mul_q+Add_q$ operation despite the fact that m was sequentially signed and aggregated with L distinct private keys. That is, the online verification efficiency is O(1) computation even if O(L) MAC computation is done at the sender side.

Another useful feature of Graphene-UMAC is cross-sender batch verification on message m. For example, assume that L' different sensors sample the same environment (e.g., sensors monitoring a room from different but overlapping sensing views), and therefore collect a similar message m. Each sensor may compute a Graphene-UMAC.LC MAC $$(\sigma_{1,L}^{1}, \ldots, \sigma_{1,L}^{L'})$$

with their secret key, as described above. Therefore, the receiver can aggregate different cumulative key pairs (A, B) of L' distinct senders beforehand as:

$$A'=\sum_{j=1}^{L'} A_j \bmod q \text{ and } B'=\sum_{i=1}^{L'} B_j \bmod q,$$

The receiver can then batch verify MACs of L' senders by checking if:

$$\sum_{j}^{L'} \sigma_{1,L}^{1} \bmod q == A'\cdot m+B' \bmod q$$

Those of skill in the art will note that the right side of the verification equation still uses only O(1) (i.e., a single $Mul_q+Add_q$ operation) to verify O(L·L') MACs, in total (L'+1)$\mathbb{F}_q$ operations (e.g., due to the aggregation at the left side of equation).

Graphene-UMAC.LC also offers batch verification for distinct messages with only aggregation or with only parts of the key. For example, in Graphene-UMAC.LC, a verifier (e.g., receiving computing device) can pre-compute B and B' for single and distinct senders, respectively. Hence, even if the verifier must perform a $Mul_q$ for each distinct message and key as $m_i \cdot a_i$ for all senders, component B or B' can be added with just single $Add_q$ as described above. Accordingly, the total overhead can be reduced from O(L+L) ($Mul_q+Add_q$) to only O(L+L)($Mul_q$).

If forward-security is not required, aggregation Graphene-UMAC.LC variants offer full batch verification as described in above. For example, let key a remain constant while key $b_i$, i=1, . . . , L is updated per message. Distinct messages ($m_1, m_2, \ldots, m_L$) can be verified as:

$$\sigma_{1,L}==\left(\sum_{1}^{L} m_1\right)\cdot a+B \bmod q$$

which is akin to batch verification in a single message case, where only one $Mul_q$ and $Add_q$ are required to sign the aggregated messages.

In existing FASP schemes, batch verification is generally not possible due to a lack of algebraic structures. Although it is possible to pre-compute keys beforehand at the verifier, they cannot be used to batch verify data items. Therefore, verification overhead for L messages and L' users is O((L·L')·H) for existing FASPs. In Graphene-UMAC.LC, with the same message batch verification, this is O(1)·($Mul_q+Add_q$), which is much more computationally efficient.

Message aggregation is another feature of Graphene that can offer enhanced privacy and statistics, such as averaging. Additive homomorphism of Graphene-UMAC.LC can complement some privacy enhancing and averaging methods. For example, some privacy-preserving schemes in wireless networks and smart-gird grid systems harness an additive homomorphic scheme such as Elgamal encryption to encrypt messages. Let C=PKEnc(m, PK) be such additively homomorphic public key encryption scheme. Let $$\{m_i\}_i^L$$

be small messages (e.g., binary votes, time stamps, small integers, etc.) such that $1<|m_i|<<q$, and L is a small integer (e.g., $|m_i|=16$, |q|=128, L=28). Finally, let ciphertext C'=PKEnc(($m_1, m_2, \ldots, m_L$), PK). It is easy to see that a pre-computation Graphene-UMAC.LC variant without forward-security, which computes MAC as:

$$\sigma_{1,L}=\left(\sum_{1}^{L} m_1\right)\cdot a+B \bmod q$$

can verify the sum of messages after their decryption in batch.

The pre-computed variant can also be combined with masked aggregation of messages. Assume, for example, that a sender aggregates messages by randomly masking each as:

$$c'=\sum_{i=1}^{L}(m_i+r_i) \bmod q$$

The receiver can batch $\sigma_{1,L}$ on $$\sum_{i=1}^{L} m_i$$

after removing the masking terms as:

$$\left(c'-\sum_{i=1}^{L} r_i\right) \bmod q.$$

Graphene-UMAC.SQH also achieves high efficiencies by requiring only $Sqr_q+Add_q$ for signing a compact message $m \in \mathbb{F}_q$. Graphene-UMAC.SQH also requires only a single key component $a \in \mathbb{F}_q$; hence, Graphene-UMAC.SQH is particularly well-suited for compact messages with time-valid applications. For example, for $q=\kappa=64$, a single AES call can produce two Graphene-UMAC.SQH keys, while only one call is needed for Graphene-UMAC.LC. With XOR chosen as aggregation, Graphene-UMAC.SQH has the half update cost along with a faster MAC computation compared to other schemes. Thus, Graphene-UMAC.SQH is a suitable choice for time-valid applications, in which high-speed and short messages with temporal security are desired.

Graphene Scheme Variants

In all the Graphene schemes described herein, key updates can be performed beforehand (e.g., offline) such that the keys (e.g., initial keys) are stored in memory of a first computing device. This is a memory-computation trade-off, in which the signer saves one PRF call during the online signing phase with the cost of single private key storage. Accordingly, each updated key is used for a separate message or time period. For example, in Graphene-AE, by pre-computing and storing 256 128-bit symmetric key (e.g., for AES) in batch beforehand, the signer of a message (e.g., sender 200) performs a single AE operation and aggregation by accepting 4 KB storage. Performing updates in batches also have computational advantages. For example, performing AES encryption in batches receive benefits from optimizations and parallelism, especially when the operation order is known beforehand (e.g., as is true of Graphene schemes).

Graphene variants, collectively referred to as "Graphene-V," inherit the pre-computation capabilities of UMAC, which can pre-compute one-time keys that are used to signed message blocks. For example, consider Graphene-UMAC.LC signing a message comprised of l q-bit chunks with $sk_i$. As in LCH, l sub-keys $$\{(a^j, b^j)\}_{j=1}^{l}$$

are derived from $sk_i$ to compute the UMAC. The pre-computation of these sub-keys may be referred to as intra-message/period pre-computation. As discussed above, Graphene-UMAC.LC is computationally efficient by leveraging batch verification. Graphene-UMAC.SQH requires one sub-key per block a', and therefore needs only half of such pre-computation, but without homomorphic features and a full permutation of LCH.

It will be appreciated that HMAC-based FASP and AE-based Graphene-AE do not offer intra-message pre-computation, but only inter-message pre-computation. Hence, Graphene-UMAC.LC can achieve high computational efficiency (e.g., two $\mathbb{F}_q$ operation per message block) and better performance than some alternatives, but with some additional storage. This trade-off can be particularly useful if the sender/receiver is storage resourceful such as a satellite (e.g., sender) or a cloud-server (e.g., receiver).

Further, forward-secure confidentiality can be added on top of any Graphene-UMAC by coupling it with a symmetric cipher. However, unlike Graphene-AE, messages are generally encrypted separately in Graphene-UMAC. Therefore, two separate key set may be used for encryption and UMAC, which may cause two distinct key evolution per update. Graphene-UMAC with confidentiality can be significantly more efficient than Graphene-AE if pre-computation is considered. For example, Graphene-UMAC.LC with intra/inter pre-computation supported with an AES-CTR Mode with pre-computation achieves high efficiency by using only $Add_q$+$Mul_q$+XOR per message block, with the cost of storing an extra 128-bit AES-CTR key per 128-bit message block on top pre-computed Graphene-UMAC.LC.

In some traditional forward-secure and aggregate digital signatures, an "all-or-nothing" property ensures that an adversary cannot selectively delete any subset messages from a trail of $(m_1, \ldots, m_L)$ protected with aggregate signature $\sigma_{1,L}$. However, this implies that if any message is mistakenly distorted or modified, the verification of the entire stream may be rendered a failure. If there is only one aggregate signature for the whole stream, it becomes difficult to detect which message or signature caused the failure. A similar problem also occurs in FASP schemes that provides all-or-nothing property. To address this problem, fault-tolerant aggregate signatures, which are public-key cryptography-based digital signatures, may be used.

Specifically, Graphene-AE with XOR and Graphene-UMAC schemes with algebraic aggregation can implement fault-tolerance using cover-free family-based redundant aggregate MACs, which are d-cover-free families. For example, d=2 means that up to two faulty messages can be tolerated by computing extra aggregate MACs for a given message trail. The number of extra MACs is an efficiency and fault-tolerance trade-off. Graphene schemes, as described herein, are suitable to adopt such redundancy techniques, since the size of authentication tags are smaller than their PKC counterparts. Therefore, the extra storage/communication and computational overhead is minimized while the added resiliency is the same.

In some implementations, a signer can apply error correction codes (ECC) to messages and/or cryptographic outputs to further increase the fault tolerance. If message compression is preferred, the signer may compress the message before applying for any cryptographic operation or redundancy on top. In some cases, it may be desirable to ensure that aggregate MACs are immutable. For example, consider a situation in which a signer first computes Graphene-UMAC.LC MACS $\sigma_{1,L'}$ and $\sigma_{1,L}$, later disclosing $\sigma_{1,L''}=\sigma_{1,L}+\sigma_{1,L'}$ mod q. If $\sigma_{1,L}$ is known, $\sigma_{1,L'}$ can be extracted from $\sigma_{1,L''}$. While this homomorphic feature can be useful, the ability to freely combine or extract authentication tags might be undesirable in some applications. For example, assume that $\sigma_{1,L'}$ and $\sigma_{1,L}$ authenticate access control rights of two user groups, are later combined in one group, and should only have an access all together but not separately. An entity who knows $\sigma_{1,L'}$ can derive $\sigma_{1,L}$ from $\sigma_{1,L''}$. Similarly, assume that these MACs represent two item sets to be sold separately. However, $\sigma_{1,L''}$ can be trivially derived from $\sigma_{1,L'}$ and $\sigma_{1,L}$, and therefore implicitly authenticates their combination (e.g., permitting their joint authenticated sell).

"Umbrella signatures" prevent the mutability of aggregate signatures by computing extra individual signatures on them. For example, an individual MAC can be computed over the aggregate MAC to be protected with a separate private key (e.g., with a key update). This individual MAC, which does not admit aggregation (e.g., an HMAC), is referred to as an umbrella MAC. In some implementations, the aggregate MAC and its corresponding umbrella MAC are maintained as a pair. In some such implementations, even if a malicious actor manipulates the aggregate MAC by aggregating or extracting subset MACs from it, they cannot produce their corresponding umbrella MACs (e.g., which cannot be aggregated). Therefore, the receiver can detect whether the received aggregate MAC is valid or has been mutated without authorization.

In some implementations, the resiliency and fault-tolerance of Graphene schemes can be further enhanced via distributed cryptography. As an example, assume that a sender will transmit to n>1 servers for redundancy and resilient purposes and that the sender has a pairwise pre-shared symmetric key with each server to establish a secure channel. For each message $m_i$, the sender creates a Shamir Secret Share (SSS) and shares it with the corresponding server via its secure channel. The sender may share a separate Graphene key with the receiver and uses it for authentication and integrity only (e.g., Graphene-UMAC variants without confidentiality). In some implementations, the sender may share keys K and K' with all the servers and recipients, respectively. In this case, the servers only offer storage and redundancy. For instance, the sender may use Graphene-AE with K' to secure data, and secret shares each ciphertext and authentication tag with servers by using K for the authenticated channel.

This approach prevents servers from learning the messages after constructing shares. As another alternative, the sender can use a public key to encrypt the messages and then secret shares them with the servers, which permits a scalable upload of encrypted messages but with the cost of public-key encryption. In some implementations, the sender can also optionally secret share either the final or any intermediate MACs in addition to ciphertexts. In some implementations, before secret sharing, the signer can apply ECCs to the messages and/or cryptographic outputs to further increase the fault tolerance. All these variants help to ensure a distributed trust such that the messages, ciphertext, and/or MACs can be recovered only if 2<=t<=n out of n servers collaborate.

In some implementations, a Graphene private key can be split among n servers such that the n servers can jointly perform Graphene functionalities (e.g., verification/decryption) without learning the private key (e.g., based only on the outcome of a function (e.g., invalid/valid MAC and/or plaintext (if Graphene with confidentiality is used))). This can result in improved functionality and security over basic secret sharing but with additional computation and communication overhead. In some implementations, Graphene-UMAC relies on simple $\mathbb{F}_q$ arithmetic, which can be executed with SPDZ even in a malicious setting (e.g., some servers deviate from the protocol or inject fault). Therefore, Graphene-UMAC in a multi-party computation (MPC) setting may be more efficient than that of traditional FASPs. Graphene-UMAC with confidentiality can also be made MPC-friendly by employing an MPC-in-the-head symmetric cipher.

Configuration of Certain Implementations

The construction and arrangement of the systems and methods as shown in the various exemplary implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the exemplary implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. A method for encrypting a message transmitted between two or more computing devices, the method comprising:

determining a current secret key that is shared between a first computing device and a second computing device, wherein the second computing device is remote from the first computing device;

calculating a current message authentication code (MAC) based on the current secret key and the message;

calculating a subsequent secret key based on the current secret key using a one-way pseudorandom function;

calculating a subsequent MAC by aggregating the current MAC and a first preceding aggregate MAC; and encrypting the message using the subsequent MAC and the subsequent secret key, wherein calculating the subsequent secret key based on the current secret key using the one-way pseudorandom function is defined as $(a_{j+1}\|b_{j+1})\leftarrow\mathrm{UPD}(a_j\|b_j)$, where $a_j$ and $b_j$ are polynomials that define the current secret key and UPD is the one-way pseudorandom function.

2. The method of claim 1, wherein the current MAC is calculated as aajj·mmjj+bbjj mod qq if mmjj∈𝔽𝔽qq, where aajj and bbjj are polynomials that define the current secret key, mmjj is the message, and qq is a large prime.

3. The method of claim 1, wherein mmjj is mapped into 𝔽𝔽qq by applying one or a full domain hash (FDH) or a universal hash if $m_j$∉𝔽𝔽qq.

4. The method of claim 1, wherein aajj and bbjj are deleted from a memory of the first computing device after calculating the subsequent secret key.

5. The method of claim 1, wherein the subsequent MAC is calculated as σσ1,jj+1←σσjj+σσ1,jj−1 mod qq, where σσjj is the current MAC, σσ1,jj−1 is the first preceding aggregate MAC, and σσ1,jj+1 is the subsequent MAC.

6. The method of claim 5, wherein σσjj and σσ1,jj−1 are deleted from a memory of the first computing device after calculating the subsequent MAC.

7. The method of claim 1, wherein the current secret key is in the format ssss1={aa1,bb1}$←ℤqq*.

8. A non-transitory computer readable medium having instructions stored thereon that, when executed by one or more processors, cause a computing device to:

determine a current secret key that is shared between the computing device and a remote computing device;

calculate a current message authentication code (MAC) based on the current secret key for a message being transmitted from the computing device to the remote computing device;

calculate a subsequent secret key based on the current secret key using a one-way pseudorandom function;

calculate a subsequent MAC by aggregating the current MAC and a first preceding aggregate MAC; and encrypt the message using the subsequent MAC and the subsequent secret key, wherein calculating the subsequent secret key based on the current secret key using the one-way pseudorandom function is defined as $(a_{j+1}\|b_{j+1})\leftarrow\mathrm{UPD}(a_j\|b_j)$, where $a_j$ and $b_j$ are polynomials that define the current secret key and UPD is the one-way pseudorandom function.

9. The computer readable medium of claim 8, wherein the current MAC is calculated as aajj·mmjj+bbjj mod qq if mmjj∈𝔽𝔽qq, where aajj and bbjj are polynomials that define the current secret key, mmjj is the message, and qq is a large prime.

10. The computer readable medium of claim 8, wherein mmjj is mapped into $𝔽𝔽_q$ by applying one or a full domain hash (FDH) or a universal hash if mmjj∉𝔽𝔽qq.

11. The computer readable medium of claim 8, wherein aajj and bbjj are deleted from a memory of the first computing device after calculating the subsequent secret key.

12. The computer readable medium of claim 8, wherein the subsequent MAC is calculated as σσ1,jj+1←σσjj+σσ1,jj−1 mod qq, where σσjj is the current MAC, σσ1,jj−1 is the first preceding aggregate MAC, and σσ1,jj+1 is the subsequent MAC.

13. The computer readable medium of claim 12, wherein σσjj and σσ1,jj−1 are deleted from a memory of the first computing device after calculating the subsequent MAC.

14. The computer readable medium of claim 8, wherein the current secret key is in the format ssss1={aa1,bb1}$←ℤqq*.

15. A method for encrypting a message transmitted between two or more computing devices, the method comprising:

determining a current secret key that is shared between the two or more computing devices;

calculating a current message authentication code (MAC) and a current ciphertext based on the current secret key and the message using authenticated encryption (AE);

calculating a subsequent secret key based on the current secret key using a one-way pseudorandom function;

calculating a subsequent MAC by aggregating the current MAC and a first preceding aggregate MAC; and encrypting the message using the subsequent MAC, the current ciphertext, and the subsequent secret key, wherein calculating the subsequent secret key based on the current secret key using the one-way pseudorandom function is defined as $(a_{j+1}\|b_{j+1})\leftarrow\mathrm{UPD}(a_j\|b_j)$, where $a_j$ and $b_j$ are polynomials that define the current secret key and UPD is the one-way pseudorandom function.

16. The method of claim 15, wherein the current MAC and the current ciphertext are calculated as (σσjj,ccjj)

←AAAA(ssssjj,mmjj), where σσjj is the current MAC, ccjj is the current ciphertext, mmjj is the message, and ssssjj is the current secret key.

17. The method of claim 15, wherein the subsequent aggregate MAC is calculated as σσ1,jj+1←σσjj⊕σσ1,jj−1, where σσjj is the current MAC, σσ1,jj−1 is the first preceding aggregate MAC, and σσ1,jj+1 is the subsequent MAC.

* * * * *